United States Patent Office 3,303,883
Patented Feb. 14, 1967

3,303,883
THERMAL NOTCHING TECHNIQUE
Marion L. Slusser, Arlington, Tex., assignor to Mobil Oil Corporation, a corporation of New York
No Drawing. Filed Jan. 6, 1964, Ser. No. 336,044
6 Claims. (Cl. 166—39)

This invention relates to a method for increasing recovery of fluids from subterranean formations. More particularly, this invention relates to a method for increasing recovery of hydrocarbon fluids particularly oil, from low permeability zones by a thermal notching technique which both increases the matrix permeability and initiates substantially horizontal fractures.

Oil accumulates in reservoirs in subterranean or subsurface formations. Wells are drilled into the subterranean formation to obtain the oil. Many subterranean formations which contain oil are stratified into zones or strata having different permeabilities. The zones of low permeability do not release their oil and, hence, impede recovery of the oil, even during primary depletion, i.e., where only initial reservoir energy is used to recover the oil. In secondary recovery operations or other operations in which a fluid is injected through an injection well to supplement the initial reservoir energy and increase recovery of the oil from the subterranean formation through production wells, the zones of low permeability are even more significant. They cause a disproportionately large amount of the injected fluid to enter the more permeable zones. This results in premature production of the injected fluid at wells, called production wells, thereabout. This is called premature breakthrough and renders even the best engineered secondary recovery project relatively ineffective.

Therefore, it becomes desirable to increase the permeability of selected zones of low permeability. In the past, there have been two methods, or combinations thereof, used to improve permeability.

The first method, acidizing, is a method in which a strong acid is injected to decompose the formation components, particularly basic components such as dolomite and other carbonate rocks, and increase the permeability of the formation matrix in the vicinity of the well. Since the area in the vicinity of the walls of the well is the most critical area, acidizing has been a popular method. However, it has certain drawbacks. For example, it is relatively ineffective at distances out into the formation from the well. Also, the acid is objectionable since it often attacks metal equipment in the well.

The second method, fracturing, is a method in which a fluid is injected to create a pressure greater than the overburden and the tensile strength of the formation. Thus, the formation is fractured or split asunder. Propping agents, such as sand, in the fracturing fluid are deposited and remain in the formation to prevent closure of the fracture when the pressure is released. Fracturing is relatively effective in reaching out into the formation. In deep wells, however, these fractures are often vertical in their orientation. Where the zone lies adjacent a body of water or gas, these vertical fractures often penetrate thereinto. In this manner, communication with the water or gas is established. Frequently a producing formation is ruined by the resulting influx of the water, or seriously curtailed by the influx of gas.

Notches, i.e. recesses of greater diameter than the well, have been mechanically reamed in attempts to control the orientation of the fractures induced in the formation. These notches represent areas of concentrated stresses. It was believed that any fracture thus induced would lie in the plane of the notch, generally horizontal. Mixed results have been obtained. Better control of orientation apparently results where the notches penetrate more deeply into the formation. The notches require special equipment and are expensive to create, especially to the significant depths necessary, e.g. one to three feet or more beyond the walls of the well into the formation.

It has been taught to burn at increasing pressure an injected combustible mixture in a well to effect heating and ultimately fracturing. Such method can be very useful in some instances. However, it does not achieve the desired goal of increasing the permeability of the low permeability strata. Rather, it weakens the more permeable strata and causes therein a fracture without preferentially orienting it and without fracturing the less permeable strata. Rapidly cooling such hot formations induces spalling and increases the effective diameter of the well. However, it fills the well with debris and reduces injectivity.

It is desirable both to increase the matrix permeability adjacent the wellbore and to initiate substantially horizontal fractures for establishing permeability out into the selected zone of the formation. It is also desirable to control the extent of fracturing. To do this, hydraulic fracturing is preferable over the use of a compressible fluid, such as air or gas.

It is an object of this invention to improve fluid permeability of selected zones within a subterranean formation by inducing physical and chemical changes into the selected zones. It is a further object of the invention to initiate substantially horizontal fractures into the selected zones within the formation and propagate these horizontal fractures to the desired depth. It is another object of the invention to induce irreversible changes in the character of the matrix of selected zones in a subsurface formation and achieve increased matrix permeability in addition to the initiation of substantially horizontal fractures. It is a particular object of the invention to provide a novel thermal notching technique to initiate a substantially horizontal fracture in a selected zone of the subsurface formation while simultaneously increasing the matrix permeability in the selected zone.

In accordance with the invention, one or more thermal notches are created in a subterranean formation adjacent a penetrating well before fracturing by a conventional hydraulic fracturing operation. A thermal notch is a volume of heat-weakened, friable, more permeable formation which will fracture at lower pressure than the normal formation matrix. The thermal notch is created by heating a selected zone in the subterranean formation. It is analogous to the mechanical notch in two respects. First, it is created in a restricted area within a less permeable stratum. Second, increasing the depth a thermal notch penetrates into the formation increases the probability of orienting the fracture, limited as noted below.

The thermal notch is produced in the restricted area by heating above a minimum critical temperature of about 1100° F. This causes a physical change by the irreversible dehydration of clay platelets reinforcing the rock matrix. Such irreversible dehydration decreases the volume occupied by the clay platelets and destroys their reinforcing capability. The high temperature also causes chemical decomposition of dolomitic components of the formation. Dolomite begins to decompose as low as 1050° F. but not significantly until above 1100° F., e.g. 1200° F. to 1300° F. Even relatively pure calcium carbonate will decompose at 1500° to 1600° F. leaving a greatly weakened oxide. Thus, an increased degree of irreversible dehydration and chemical decomposition is wrought by increasing the temperature, limited by the fusion temperature of the components (generally 2000° F. or higher).

Both the physical and chemical changes induced by the thermal notch increase permeability of the matrix and decrease its resistance to fracturing. Subsequent conventional hydraulic fracturing controllably creates further physical changes which dramatically increase the permeability of the less permeable strata. A propping agent emplaced during the fracturing maintains the permeability.

The invention provides a simple, economical way of: (1) selectively increasing fluid permeability of less permeable strata in the critical area adjacent the well; (2) selectively initiating, orienting, and controlling the extent of fractures in the less permeable strata; and (3) initiating and orienting fractures in multiple wells to establish communication therebetween.

In operation, a suitable heating means is positioned in a well adjacent a selected, low permeability zone within a subsurface formation. The length of the selected zone is controlled by the stratification of the formation. Suitable heating means include an electric heater, a gas-fired heater, a chemical reaction, or localized in-situ combustion such as carried out between high temperature cement plugs in a well. The heating is continued until the temperature of the zone is at least 1100° F. at a distance of at least one foot deep out into the formation from the well. The length of time required for this heating will be determined by the conductivity of the formation, the heat output of the heating means, and the length of the zone wherein the thermal notch is to be created. For example, it may take two weeks or more of continuous heating to establish an effective thermal notch. Because the tendency of the fractures to be oriented along the plane of the formation is increased by deeper thermal notches, the heating can be continued for a long time without close supervision. The time is limited only by the requirement that the thermal notch be restricted to the less permeable strata and not weaken the matrix in the permeable strata also.

After the thermal notch has been established to the desired distance, e.g., from one to three feet or more into the formation from the wall of the well, hydraulic pressure is imposed onto the zone by pumping a fracturing liquid having a propping agent suspended therein into the well. The hydraulic pressure may be imposed only on the selected zone to initiate substantially horizontal fractures. However, the expense of isolating the selected zones is often prohibitive. The method of the invention has its greatest advantage wherein multiple selected zones are to be fractured and wherein multiple thermal notches have been created. The hydraulic pressure can then be imposed over the entire formation. Since the selected zones have been greatly weakened by the thermal notches, they will start to fracture at a lower hydraulic pressure than the remainder of the formation. The application of hydraulic pressure is continued by continuing to pump the fracturing liquid into the well. This causes a concentration of stresses which continues to propagate the fracture, at the lower hydraulic pressure, along the plane of the less permeable strata. Hence, selective fracturing in the low permeability zones is provided.

The depth to which these fractures can be propagated into the formation is controlled by the output of the prime movers or the pumps supplying the high pressure fracturing fluid and the degree of fracturing and quantity of liquid which the selected zones will take. Where adjacent wells are closely spaced, the fracture may be propagated completely to an adjacent well. Alternatively, it may be desirable to initiate a fracture, either simultaneously or subsequently, in the selected zones at the adjacent well. In formation such as the Colorado oil shale or the Athabasca tar sands, it is often desirable to establish communication between adjacent wells. This can be accomplished most easily by initiating in each well substantially horizontal fractures at selected depths in the subterranean formation, using the method of the invention.

Following the treatment by the method of the invention, i.e., the thermal notching with subsequent hydraulic fracturing, the well is restored to either production or injection as in a conventional fracturing technique. Further, as in conventional fracturing operations, a propping agent may be left in the fracture to prevent closure thereof.

It is intended to cover such other uses and embodiments of this invention as fall within the scope of the appended claims.

I claim:

1. A method of fracturing at least one selected low permeability zone within a subterranean formation penetrated by a well which comprises:
    (a) locally heating said selected low permeability zone to a temperature of at least 1100° F. to a depth of at least one foot from the wall of the well into the subterranean formation to effect irreversible changes which weaken the structural strength of said formation in said zone, and
    (b) subsequently applying hydraulic pressure to initiate a substantially horizontal fracture in said zone and to propagate said fracture to the desired depth into said subterranean formation.

2. The method of claim 1 wherein temperatures in excess of 1200° F. are created at depths between one and three feet from the wall of the well into the subterranean formation.

3. A method for initiating substantially horizontal fractures in at least one selected low permeability zone of a subterranean formation penetrated by a well, which comprises the steps of:
    (a) locally heating said selected low permeability zone to a temperature in excess of 1100° F. to a depth of at least one foot from the wall of the well into the subterranean formation to effect irreversible changes which weaken the structural strength of said formation in said zone, and
    (b) subsequently applying hydraulic pressure lower than that required to fracture other zones within said subterranean formation but high enough to fracture said heat-weakened zone by pumping a fracturing liquid having a propping agent suspended therein, and depositing said propping agent in said fractures.

4. A method of creating substantially horizontal fractures in selected zones having low permeability of a subterranean formation penetrated by a well, which comprises the steps of:
    (a) creating thermal notches by locally heating said selected zones to a temperature in excess of 1100° F. to a depth of at least one foot from the walls of the well to effect irreversible changes therein resulting in a weakened, friable condition,
    (b) pumping a hydraulic fracturing fluid having a propping agent suspended therein through said well into said subterranean formation,
    (c) applying a hydraulic pressure sufficiently great to initiate substantially horizontal fractures in the selected zones, said pressure being lower than that required to fracture the remainder of the subterranean formation, and (d) continuing the application of said hydraulic pressure to propagate the fracture substantially along the plane of the selected zones to the desired depth, and simultaneously depositing the propping agent in said fractures to prevent subsequent closure.

5. The method of claim 4 wherein said fracture is propagated until it is in communication with an adjacent well in said subterranean formation.

6. The method of claim 4 wherein the local heating of step (a) is continued until the thermal notch reaches a temperature in excess of 1500° F. whereby chemical changes are wrought to increase the fluid permeability adjacent the well.

References Cited by the Examiner
UNITED STATES PATENTS

| | | | |
|---|---|---|---|
| 2,685,930 | 8/1954 | Albaugh | 166—42.1 |
| 2,796,935 | 6/1957 | Bond | 166—39 |
| 2,838,117 | 6/1958 | Clark et al. | 166—42.1 |
| 2,939,688 | 6/1960 | Pelzer | 166—42.1 |
| 3,106,244 | 10/1963 | Parker | 166—11 |
| 3,137,347 | 6/1964 | Parker | 166—39 |

CHARLES E. O'CONNELL, *Primary Examiner.*

S. J. NOVOSAD, *Assistant Examiner.*